United States Patent [19]

Krupp et al.

[11] Patent Number: 5,254,299
[45] Date of Patent: Oct. 19, 1993

[54] METHOD OF IMPROVING MELT SPINNING OF LINEAR ETHYLENE POLYMERS

[75] Inventors: Stephen P. Krupp, Houston; John O. Bieser, Lake Jackson; Edward N. Knickerbocker, League City, all of Tex.

[73] Assignee: The Dow Chemical Company, Midland, Mich.

[21] Appl. No.: 750,662

[22] Filed: Aug. 27, 1991

Related U.S. Application Data

[63] Continuation-in-part of Ser. No. 428,280, Oct. 27, 1989, Pat. No. 5,112,686, which is a continuation-in-part of Ser. No. 339,335, Apr. 17, 1989, Pat. No. 4,990,204, which is a continuation-in-part of Ser. No. 114,169, Oct. 27, 1987, Pat. No. 4,842,922.

[51] Int. Cl.⁵ .................................................. D01D 1/10
[52] U.S. Cl. .................................. 264/40.2; 264/169; 264/176.1; 264/210.8; 425/198; 425/199; 425/464
[58] Field of Search ............... 264/176.1, 169, 210.8, 264/290.5, 178 F, 40.2, 40.1, 211.14; 425/198, 199, 197, 464, 463, 380, 378.2

[56] References Cited

U.S. PATENT DOCUMENTS

| | | | |
|---|---|---|---|
| 2,869,176 | 1/1959 | Wright | 425/464 |
| 3,634,576 | 1/1972 | Stuchlik | 264/169 |
| 3,709,971 | 1/1973 | Shimoda et al. | 425/198 |
| 3,847,524 | 11/1974 | Mott | 425/198 |
| 4,512,731 | 4/1985 | Cobb . | |
| 4,562,022 | 12/1985 | Li et al. | 264/210.8 |
| 4,671,918 | 6/1987 | Tomo et al. | 425/380 |
| 4,681,721 | 7/1987 | Benoit et al. | 264/169 |
| 4,859,398 | 8/1989 | Su | 264/176.1 |
| 5,133,917 | 7/1992 | Jezic et al. | 264/210.8 |

FOREIGN PATENT DOCUMENTS

| | | | |
|---|---|---|---|
| 43-19101 | 8/1968 | Japan | 425/199 |
| 62-15314 | 1/1987 | Japan | 425/198 |
| 2-223406A | 9/1990 | Japan . | |
| 8904924 | 5/1990 | PCT Int'l Appl. . | |
| 2234189 | 1/1991 | United Kingdom . | |

OTHER PUBLICATIONS

D. R. Gregory and Richard G. Griskey, Flow of Molten Polymers Through Porous Media, *AICHE Journal*, vol. 13, No. 1, 1967, pp. 122–125.
Mott Metallurgical Corporation, *Pack Filtration in Melt Polymer Spinning*, Jun. 1987 (form No. DB 12070).
L. J. Ortino and E. R. Clark in Selection of Melt Polymer Extended Area Filters, International Fiber Journal, vol. 4, No. 2 pp. 24–42, Apr. 1989.
Uses of Large-Area Filters and Dynamic Melt Mixers for Improving Quality in Spinning Extrusion, by F. Hensen, *Advances in Polymer Technology*, vol. 3, No. 4, pp. 339–353.
Choosing PP Resin for Fiber Production, by Robert M. Burton, *Nonwovens World*, Mar./Apr. 1990.
*Plastics Extrusion Technology*, (1988) Ch. 17, by M. Myer pp. 561–613.
CA 104:225950A.
39–*Textiles* 84:137046y.
37–*Plastics Fabr., Uses*, 83:132795m.

*Primary Examiner*—Jeffrey Thurlow

[57] ABSTRACT

An improved method of melt spinning linear polyethylene into fiber, especially fine denier fiber, with minimal fiber breakage is disclosed. The method includes imparting high shear into the polyethylene just prior to extrusion through the spinneret die and also results in lower die swell. The high shear can be imparted by use of sintered metal filter media, multiple stacks of fine mesh screens or similar shear inducing media. The method is especially effective when the linear polyethylene contains a relatively high molecular weight species, as determined using gel permeation chromatography with a low angle laser light scattering detector.

11 Claims, 4 Drawing Sheets

METHOD OF IMPROVING MELT SPINNING OF LINEAR ETHYLENE POLYMERS

CROSS-REFERENCE TO RELATED APPLICATIONS

This application is a continuation-in-part of pending application Ser. No. 428,280, filed Oct. 27, 1989, now U.S. Pat. No. 5,112,686 which itself is a continuation-in-part of application Ser. No. 07/339,335, filed Apr. 17, 1989, now U.S. Pat. 4,990,204 which itself is a continuation-in-part of Application Ser. No. 07/114,169, filed Oct. 27, 1987, now U.S. Pat. No. 4,842,922. All of the above applications and patents are incorporated herein by reference.

FIELD OF THE INVENTION

This invention relates to a method of improving the melt spinnability of linear polyethylene. More particularly, the invention relates to using high shear tortuous path filtration media when melt spinning linear polyethylene prior to extrusion through a spinneret.

BACKGROUND OF THE INVENTION

Thermoplastic polymers, e.g., polyester and polypropylene, are known to be able to be melt extruded into monofilament and strand of denier greater than 15 denier per filament (dpf), especially greater than 30 dpf.

Convenient references which relate to fibers and filaments, including those of man-made thermoplastics, and incorporated herein by reference, are, for example:
(a) *Encyclopedia of Polymer Science and Technology*, Interscience, New York, Vol. 6 (1967) pp. 505-555 and Vol. 9 (1968) pp. 403-440.
(b) *Man-Made Fiber and Textile Dictionary*, published by Celanese Corporation:
(c) Fundamentals of Fibre Formation—The Science of Fibre Spinning and Drawing. by Andrzij Ziabicki, published by John Wiley & Sons, London/New York, 1976:
(d) *Man-Made Fibres*, by R. W. Moncrieff, published by John Wiley & Sons. London/New York, 1975:
(e) *Kirk-Othmer Encyclopedia of Chemical Technology*, Vol. 16 for "Olefin Fibers" published by John Wiley & Sons, New York, 1981, 3rd Edition.

In conformity with commonly accepted vernacular or jargon of the fiber and filament industry, the following definitions apply to the terms used in this disclosure:

A "monofilament" (a.k.a. monofil) refers to an extruded individual strand of denier greater than 15, usually greater than 30;

A "fine denier fiber or filament" refers to an extruded strand of denier less than about 15;

A "multi-filament" (a.k.a. multifil) refers to simultaneously extruded fine denier filaments formed as a bundle of fibers, generally containing at least 3, preferably at least about 15-100 fibers and can be several hundred or several thousand;

"Staple fibers" refers to fine denier strands which have been formed at, or cut to, staple lengths of generally about 1 to about 8 inches;

An "extruded strand" refers to an extrudate formed by passing polymer through a forming-orifice, such as a die.

Practitioners are aware that it is easier to make a coarse monofilament yarn of 15 denier than to make a multi-filament yarn of 15 denier. It is also recognized that the mechanical and thermal conditions experienced by a bundle of filaments, whether in spinning staple fibers or in multi-filament yarns, are very different to those in spinning monofilaments. The fact that a given man-made polymer can be extruded as a monofilament, does not necessarily herald its use in fine denier or multi-filament extrudates.

Linear low density polyethylene (LLDPE) has been shown to be melt spun into fine diameter fiber, i.e., fiber denier less than about 15 dpf, e.g. in U.S. Pat. No. 4,830,907, incorporated herein by reference. Difficulties arise, however, when one tries to melt spin LLDPE to a denier size less than about 6 dpf for a specified length of time, while minimizing filament breaks. Spinning LLDPE to a fiber size of less than about 6 dpf, preferably to about 3-4 dpf is especially desirable in personal care types of products, such as baby diaper coverstock and feminine hygiene products, to ensure uniform coverage at low basis weights.

Melt spinning LLDPE into fine denier fiber, e.g., 15 dpf, and subsequently mechanically drawing is not acceptable for obtaining fiber having a denier less than about 6 dpf, especially when that fiber is utilized in a thermal bonding application. Not only does the secondary drawing step create an additional process limitation, but also causes high shrinkage of that fiber when the fiber is later thermally bonded into fabric, creating poorly bonded fabric.

When the fiber is made via a spunbond process, a secondary drawing step is not an option and the fiber must be melt drawn without fiber breakage to its final diameter. In spunbond applications such as baby diaper coverstock, the desired final diameter is usually about 3-4 dpf. The small diameter ensures uniform coverage of the fabric and adequate bonded fabric strength from the fibers which are thermally bonded.

Many process limitations or choices exist in a staple fiber manufacturing line or in a spunbond fabric manufacturing line, and many of these have been optimized for melt spinning a particular type of polymer for maximum effect. These process steps include extruder screw design, polymer melt spinning temperature, quench (i.e., cooling) temperature, polymer throughput, spinneret design (e.g., die hole size, entrance angle, and hole concentration), and of course, polymer design.

One process limitation, the spin pack filtration media, has traditionally been used to remove gross contamination and prevent die plugging in melt spinning various polymers. The spinnerets used in the melt extrusion usually have very small diameter holes (on the order of approximately 600 micrometers diameter) and polymer contamination can create plugging of the spinneret and subsequent equipment shutdown.

Historically, thermoplastic polymers have utilized various kinds of filtration media, usually commensurate with the degree of contamination. Typical melt spinning filtration consists of multilayered screen packs, sand, bauxite type filtration and sintered metal filters. Modern polymers such as polypropylene or polyethylene typically use a three layer screen pack (e.g., 325/60/20 mesh screens sandwiched together) immediately prior to extrusion through the spinneret die to remove incidental gross contamination, since modern polymers are generally free of fine particulate contamination. The function of the filtration media has been to remove this incidental gross contamination (e.g., dirt or insoluble particles). Modern polymers, however, are usually uncontaminated with respect to fine particles, precluding the need for filtration finer than the three layer screen packs described above.

Melt spinning linear polyethylene, especially LLDPE, using little or no filtration (e.g., single layer screen packs) is difficult, especially when trying to spin into finer denier fiber (i.e., fiber having a denier of less than about 6 dpf) with minimal fiber breaks. The choice of filtration media immediately prior to extrusion through a spinneret die has now been discovered to affect the ability of linear ethylene polymers to be melt drawn into finer diameter fiber.

SUMMARY OF THE INVENTION

It has now been discovered that by inducing higher shear and micro-mixing in a spin pack just prior to extrusion through a spinneret die, using, e.g., sintered metal filter media, the melt spinnability of one or more linear ethylene polymers can be surprisingly improved, preferably melt drawing into a fiber of less than about 6 denier per filament. The improvement is especially pronounced when using increasingly higher shear media while melt spinning at least one linear ethylene polymer having a weight average molecular weight of more than about $1 \times 10^5$ as measured using gel permeation chromatography (GPC) with a low angle laser light scattering (LALLS) detector and melt spinning to a denier of about 9 dpf or less.

In another aspect, the invention is a method of reducing die swell of a molten linear ethylene polymer. The method comprises imparting high shear to the molten linear ethylene polymer just prior to extrusion of the polymer through a die. The method of reducing die swell is especially effective when further comprising the step of melt spinning the molten linear ethylene polymer into a fiber having a diameter less than about 6 denier per filament.

DETAILED DESCRIPTION OF THE INVENTION

Figure 1:
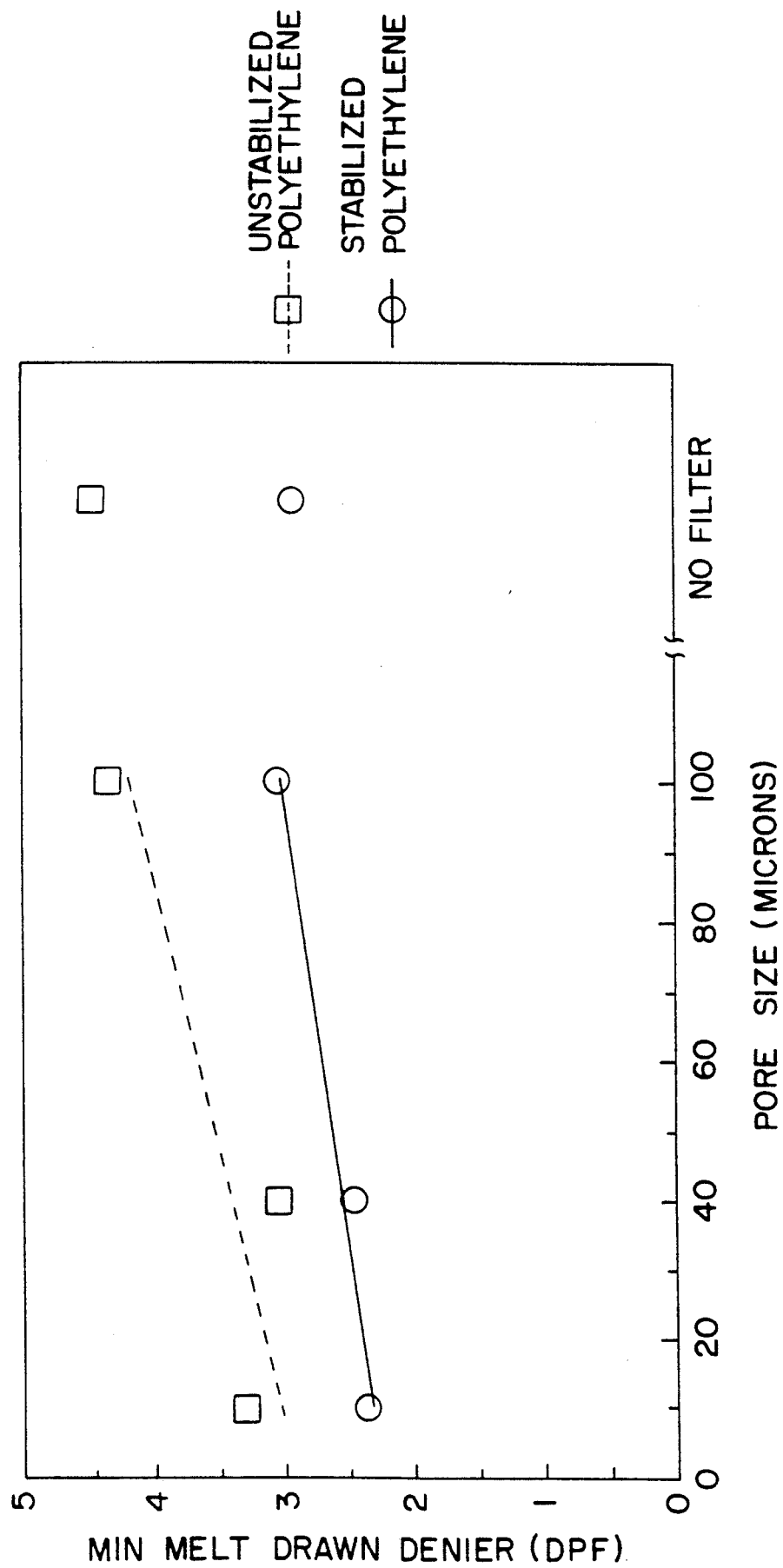
FIG. 1 graphically displays data from Example 1, Tables 4 and 7, for melt spinning two linear polyethylenes at a throughput rate of about 0.403 grams/minute/hole and at a melt temperature of 224° C.

Manufacture of linear polyethylene is disclosed, e.g., in U.S. Pat. No. 4,076,698, incorporated herein by reference, and involves coordination catalysts of the "Ziegler" type or "Phillips" type and includes variations of the Ziegler type, such as the Natta type. These catalysts may be used at very high pressures, but may also (and generally are) used at very low or intermediate pressures. The use of coordination-type catalysts for copolymerizing ethylene with higher alkenes to make linear low density polyethylene and ultra low density polyethylene copolymers having densities between about 0.88 g/cc and about 0.94 g/cc is disclosed variously in, e.g., U.S. Pat. Nos. 2,699,457; 2,846,425; 2,862,917; 2,905,645; 3,058,963; 4,076,698; and 4,668,752, incorporated herein by reference. The products made by these coordination catalysts are generally known as "linear" polymers because of the substantial absence of branched chains of polymerized monomer units pendant from the main polymer "backbone." It is these linear polymers to which the present invention pertains.

Linear low density polyethylene (LLDPE) and ultra low density polyethylene (ULDPE) typically have a density between about 0.88 grams/cubic centimeter (g/cc) and about 0.94 g/cc. The density of the polyethylene is lowered by copolymerizing ethylene with minor amounts of at least one alpha, beta-ethylenically unsaturated alkene(s) having from 3 to 20 carbons per alkene molecule (e.g., 1-propene, 1-butene, 1-pentene, 4-methyl-1-pentene, 1-hexene, 1-octene, 1,9-decadiene and 1,7-octadiene), preferably 4 to 8 carbon atoms (e.g., 1-butene, 1-hexene and 1-octene) and most preferably 8 carbons per alkene molecule (i.e., 1-octene). The amount of the alkene comonomer is generally sufficient to cause the density of the linear low density polymer to be substantially in the same density range as low density polyethylene (LDPE), due to the alkyl side chains on the polymer molecule, yet the polymer remains in the "linear" classification; they are conveniently referred to as "linear low density polyethylene."

High density polyethylene (HDPE) can also be used in the improved melt spinning method of the present invention. High density polyethylene has a density in the range of from about 0.941 g/cc to about 0.965 g/cc. HDPE can be made either by polymerizing ethylene homopolymer, or by polymerizing ethylene with minor amounts of at least one alpha, beta-ethylenically unsaturated alkene(s) having from 3 to 20 carbons per alkene molecule.

The polymerization processes can be a solution polymerization process, or, e.g., a slurry polymerization process for manufacturing HDPE. Both the solution polymerization process and the slurry polymerization process are well known to those skilled in the art.

Thus, the density of the linear ethylene polymers useful in the improved melt spinning method in the present invention is from about 0.88 g/cc to about 0.965 g/cc, preferably from about 0.94 g/cc to about 0.965 g/cc, and especially from about 0.95 g/cc to about 0.965 g/cc.

The polymerization process can also occur in multiple reactors, as is disclosed in U.S. Pat. No. 3,914,342 or by using multiple catalysts, as is disclosed in U.S. Pat. No. 4,939,217, both incorporated herein by reference, creating linear ethylene polymers having broad molecular weight distributions, and sometimes multimodal molecular weight distribution curves.

The molecular weight distribution of the linear ethylene polymers useful in the present invention is indicated and measured by $I_{10}/I_2$ according to ASTM D-1238, Conditions (N) (190° C./10 kilograms) and (E), respectively. Molecular weight distribution can be achieved by varying catalytic conditions, reactor conditions or feed percentages. Blends of polyethylenes can also be used to prepare the linear ethylene polymers for use in the present invention. Such blends can be prepared by blending separate and discrete polyethylene polymers, or polymerizing the polyethylene polymer in-situ in multiple reactors, (e.g. the technique disclosed in U.S. Pat. No. 3,914,342). It is important that the linear polyethylene(s) be well mixed when using discrete polymer blends.

The molecular weight of the linear ethylene polymers useful in the present invention is indicated and measured by melt index according to ASTM D-1238, Condition (E) (i.e., 190° C./2.16 kilograms): also known as $I_2$ and can vary from about 0.01 grams/10 minutes to about 3000 grams/10 minutes.

Additives, (e.g., anti-oxidants, pigments, hydrophobic and/or hydrophilic agents, etc.), may be incorporated into the linear ethylene polymers to the extent that they do not interfere with the melt spinning performance.

During research to determine the differences between various production melt spinning lines and small pilot melt spinning lines, it was discovered that finer filtration or higher shear media placed in the spin pack immediately prior to extrusion through a spinneret die enables finer diameter fibers to be continuously melt spun from linear ethylene polymers with fewer spinning breaks. This experience is somewhat contradictory to fundamental LLDPE processing procedure of lower shear processing. The recognized policy for melt processing linear ethylene polymers, especially LLDPE, is to utilize as low as shear as possible, since higher shear conditions are suspected of increasing the potential for cross-linking the polymer, leading to even more extrusion difficulties.

Commercial fiber and nonwoven manufacturers have traditionally used coarse layered screen packs to spin polypropylene (PP) merely as an aid to remove gross contamination. We have discovered that removal of these screens altogether has an insignificant effect on the melt spinning of PP, since modern fiber grade polymers such as PP are supplied relatively clean and free of contamination. Polypropylene, therefore, seems to be insensitive to these shear/filtration effects, since our experiments show that PP can be drawn down to fine diameter with little difficulty without filtration media in the spin pack at all.

Using layered screens, or, using the same type of coarse filtration screens used when spinning PP, does not allow commercial fiber and nonwoven fabric manufacturers to melt spin fiber grade linear ethylene polymers to finer diameter fiber, especially less than about 6 dpf, for extended time periods without fiber breakage.

By imparting higher shear just prior to extrusion of the linear ethylene polymer through the die, the melt spinning of the linear ethylene polymer is improved such that the linear ethylene polymer is melt drawn into a fiber of less than about 6 denier per filament. The method of the present invention can be used on any melt spinning line which can be modified by inserting the high shear media into the spin pack just prior to extrusion of the linear ethylene polymer through the spinneret die. High shear media found to be effective for improving the melt spinning of linear ethylene polymers include sintered metal filters (e.g., those having 100 micrometers or less tortuous path size, especially about 40 micrometers or less), and multiple layers of screen mesh (e.g., two or more layers of 400 mesh screens) and sand. Generally, the amount of shear and micro-mixing applied to the linear ethylene polymer immediately prior to extrusion through a spinneret die is dependent upon the molecular weight of the ethylene polymer; i.e., the higher the molecular weight of the linear ethylene polymer, the more intensive the shear required to melt spin the linear ethylene polymer into fiber having a denier less than about 6 dpf. Other high shear media can work as well, but it important that enough shear is imparted to the linear ethylene polymer to allow the melt spun diameter to be about 6 dpf or less with little fiber breakage.

It is also important that the high shear media be placed immediately prior to the die, without much void space in order that the linear ethylene polymer molecules are not re-entangled, thus negating the effects of the shear media. Typical melt spinning operations which can use this invention include melt blowing spinning lines, spunbonded spinning lines and staple fiber melt spinning lines. This invention is especially effective when used in melt spinning equipment which operates at throughput rates of at least 0.1 grams/minute/hole, preferably at least 0.4 grams/minute/hole. The staple fiber melt spinning lines include both the conventional spinning lines (e.g., those which have a secondary drawing step separate and apart from the melt drawing step) and compact melt spinning lines (e.g., those which have the secondary drawing step in line with the melt drawing step, attached to the same piece of equipment).

Experimental Procedure

For Comparative Example 1 and for Example 1, the spinning system is a small pilot conventional spinning line. This melt spinning line has a one inch diameter extruder which is operated at a fixed 1500 pounds per square inch (psi) pressure screw feed pressure, feeding a Zenith gear pump (1.168 cubic centimeters/revolution) which feeds the spin pack.

The spin pack is comprised of 18 sintered metal filters (manufactured by MOTT Metallurgical Corp.) which can have different nominal pore sizes which effect filtration (and, as we have discovered for linear ethylene polymers in the present invention—shear) of a polymer by the tortuous path method. The sintered metal filters are pressure fitted into a metal breaker plate for support and sealing. Each of these sintered metal filters measures about 4.4 cm length by about 1 cm diameter and are cylindrically shaped. Total available surface area of the 18 filters is about 259 cm$^2$. For the data labeled "NONE", the breaker plate alone was installed into the spin pack without filters. The spinneret used in the filter experiments has 108 holes, hole diameter of 600 $\mu$m and a hole length to diameter (L/D) ratio of 4 to 1. The experiments performed without filters use a 68 hole spinneret, with other parameters remaining the same (diameter, L/D, throughput per hole, etc).

Only the first godet station is used, as the measurements are intended to characterize the maximum melt draw of the polymer under a given set of conditions, with no additional secondary drawing. The godet temperature was at room temperature for all of the experiments. The godet has a maximum speed of about 3200 revolutions per minute (1577 meters/minute) which is the mechanical limitation of the equipment.

The polymer to be tested is loaded into the hopper feeding the extruder, melted and conveyed to the gear pump, metered into the spin pack and extruded through the spinneret. The extruded fibers are wrapped around the godet (having a circumference of about 0.478 meters) and the godet speed is gradually increased in increments of about 50–100 rpm until about 5% of the fibers have broken (about 5 fibers using a 108 hole spinneret). The maximum godet speed at which 5% of the fibers break is then recorded and the trial repeated. Each experiment began by starting the fiber line on the godet at about 300-400 rpm. Quench flow is minimal with all quench zones closed and the quench air temperature at ambient (about 25° C.).

Fiber denier is calculated using the folowing formula:

$$\frac{\text{Throughput (gm/min/hole)}}{\text{maximum revolutions/min}} \times \frac{\text{revolutions}}{0.478 \text{ meters}} \times \frac{9000 \text{ meters}}{1 \text{ gram/denier}}$$

COMPARATIVE EXAMPLE 1

Polypropylene Without Shear

Using a pilot conventional melt spinning line, a fiber grade polypropylene (MFR=30 grams/10 minutes (ASTM D-1238, Condition 230° C./2.16 kg)) is melt spun at two temperatures, three throughputs and four filtration severities (no filters, 100 μm, 40 μm and 10 μm sintered metal filters) with the net result being that the fiber spun to very small diameters (often maximizing our spinning velocities) with minimal to no fiber breaks under all conditions. Tables 1 and 2 display the comparative example data for polypropylene:

TABLE 1

Polypropylene
Melt Temperature = 233° C.

| Filter "Pore Size" | Throughput (gm/min/hole) | Godet Speed (rpm) | Calculated denier per filament |
|---|---|---|---|
| 10 μm | 0.403 | >3200 | ≦2.37 |
|  | 0.164 | 2850 | 1.08 |
|  | 0.082 | 1500 | 1.03 |
| 40 μm | 0.403 | >3200 | ≦2.37 |
|  | 0.164 | >3200 | ≦0.96 |
|  | 0.082 | 2200 | 0.7 |
| 100 μm | 0.403 | 3300** | 2.3 |
|  | 0.164 | 3200** | 1.29 |
|  | 0.082 | 1900 | 0.81 |
| NONE* | 0.403 | 3200** | ≦2.37 |
|  | 0.164 | 3200** | ≦1.29 |
|  | 0.082 | 1700 | 0.91 |

*No filters used 108 hole spinneret/600 μm holes/4:1 L/D
*68 hole spinneret/600 μm holes/4:1 L/D
**Maximum rpm without fiber breakage

TABLE 2

Polypropylene
108 hole spinneret/600 μm holes/4:1 L/D
Melt Temperature = 260° C.

| Filter "Pore Size" | Throughput (gm/min/hole) | Godet Speed (rpm) | Calculated denier per filament |
|---|---|---|---|
| 40 μm | 0.403 | 3200* | ≦2.37 |
|  | 0.164 | 3200* | ≦0.96 |
|  | 0.082 | 2450 | 0.63 |
| 100 μm | 0.403 | 3300** | ≦2.37 |
|  | 0.164 | 3200** | ≦0.96 |
|  | 0.082 | 1900 | 0.61 |
| NONE* | 0.403 | 3200** | ≦2.37 |
|  | 0.164 | 3200** | ≦0.96 |
|  | 0.082 | 1700 | 0.59 |

*No filters used: 68 hole spinneret/600 μm holes/4:1 L/D
**Maximum rpm without fiber breakage As the data indicate, polypropylene can be melt drawn down to very fine denier without fiber breakage with or without shear, thus demonstrating polypropylene's insensitivity to the effects of shear just prior to extrusion through the spinneret.

EXAMPLE 1

Linear Polyethylene

Linear low density polyethylene (ethylene/1-octene copolymer), with and without anti-oxidant, melt index of about 12 grams/10 minutes (ASTM D-1238, Condition 190° C./2.16 kg), density of 0.935 g/cc, is melt spun into fiber at three temperatures, three throughputs and four filtration severities (no filters, 100 μm, 40 μm and 10 μm sintered metal filters) and tested for minimum fiber size at maximum melt draw godet spinning speed. Tables 3–8 below summarize melt spinning results for this linear low dernsity polyethylene, both unstabilized and stabilized.

TABLE 3

Polyethylene (w/o additives)
Melt Temperature = 204° C.

| Filter "Pore Size" | Throughput (gm/min/hole) | Godet Speed (rpm) | Calculated denier per filament |
|---|---|---|---|
| 10 μm | 0.164 | 1400 | 2.21 |
|  | 0.082 | 700 | 2.21 |
| 40 μm | 0.403 | 1400 | 2.81 |
|  | 0.164 | 750 | 2.38 |
|  | 0.082 | 400 | 3.09 |
| 100 μm | 0.403 | 2450 | 3.1 |
|  | 0.164 | 1150 | 2.69 |
|  | 0.082 | 600 | 2.57 |

TABLE 4

Polyethylene (w/o additives)
108 hole spinneret/600 μm holes/4:1 L/D
Melt Temperature = 224° C.

| Filter "Pore Size" | Throughput (gm/min/hole) | Godet Speed (rpm) | Calculated denier per filament |
|---|---|---|---|
| 10 μm | 0.403 | 2300 | 3.3 |
|  | 0164 | 2100 | 1.47 |
|  | 0.082 | 1000 | 1.54 |
| 40 μm | 0.403 | 2500 | 3.04 |
|  | 0.164 | 1650 | 1.87 |
|  | 0.082 | 900 | 1.72 |
| 100 μm | 0.403 | 1750 | 4.34 |
|  | 0.164 | 1150 | 2.69 |
|  | 0.082 | 900 | 1.72 |
| NONE* | 0.403 | 1700 | 4.46 |
|  | 0.164 | 1050 | 2.94 |
|  | 0.082 | 950 | 1.63 |

*No filters used: 68 hole spinneret/600 μm holes/4:1 L/D

TABLE 5

Polyethylene (w/o additives)
108 hole spinneret/600 μm holes/4:1 L/D
Melt Temperature = 260° C.

| Filter "Pore Size" | Throughput (gm/min/hole) | Godet Speed (rpm) | Calculated denier per filament |
|---|---|---|---|
| 10 μm | 0.403 | 700* | 10.84 |
|  | 0164 | 2600 | 1.19 |
|  | 0.082 | 1400 | 1.1 |
| 40 μm | 0.403 | 1300 | 5.84 |
|  | 0.164 | 2400 | 1.29 |
|  | 0.082 | 1400 | 1.1 |
| 100 μm | 0.403 | <350** | >21.7 |
|  | 0.164 | 1950 | 1.58 |
|  | 0.082 | 1250 | 1.24 |
| NONE* | 0.403 | 500** | ≧15.2 |
|  | 0.164 | 2000 | 1.54 |
|  | 0.082 | 1300 | 1.19 |

*No filters used: 68 hole spinneret/600 μm holes/4:1 L/D
**Quench difficulties: the polymer was too hot at high throughputs

TABLE 6

Polyethylene (with 1000 ppm antioxidant)
108 hole spinneret/600 μm holes/4:1 L/D
Melt Temperature = 204° C.

| Filter "Pore Size" | Throughput (gm/min/hole) | Godet Speed (rpm) | Calculated denier per filament |
|---|---|---|---|
| 10 μm | 0.164 | 2000 | 1.54 |
|  | 0.082 | 900 | 1.72 |
| 40 μm | 0.403 | 3200* | ≦2.37 |
|  | 0.164 | 1750 | 1.76 |
|  | 0.082 | 850 | 1.82 |
| 100 μm | 0.403 | 2700 | 2.81 |
|  | 0.164 | 1800 | 1.72 |
|  | 0.082 | 950 | 1.63 |

*Maximum melt draw speed

FIG. 1 graphically represents the effect of pore size on minimum melt drawn fiber denier for both the linear unstabilized polyethylene and the linear stabilized polyethylene, at a throughput rate of about 0.403 grams/minute/hole and at a melt temperature of about 224° C. As the graph indicates, using higher shear media, especially while stabilizing the polyethylene, enables the polyethylene to be melt drawn to a finer diameter.

Figure 2:
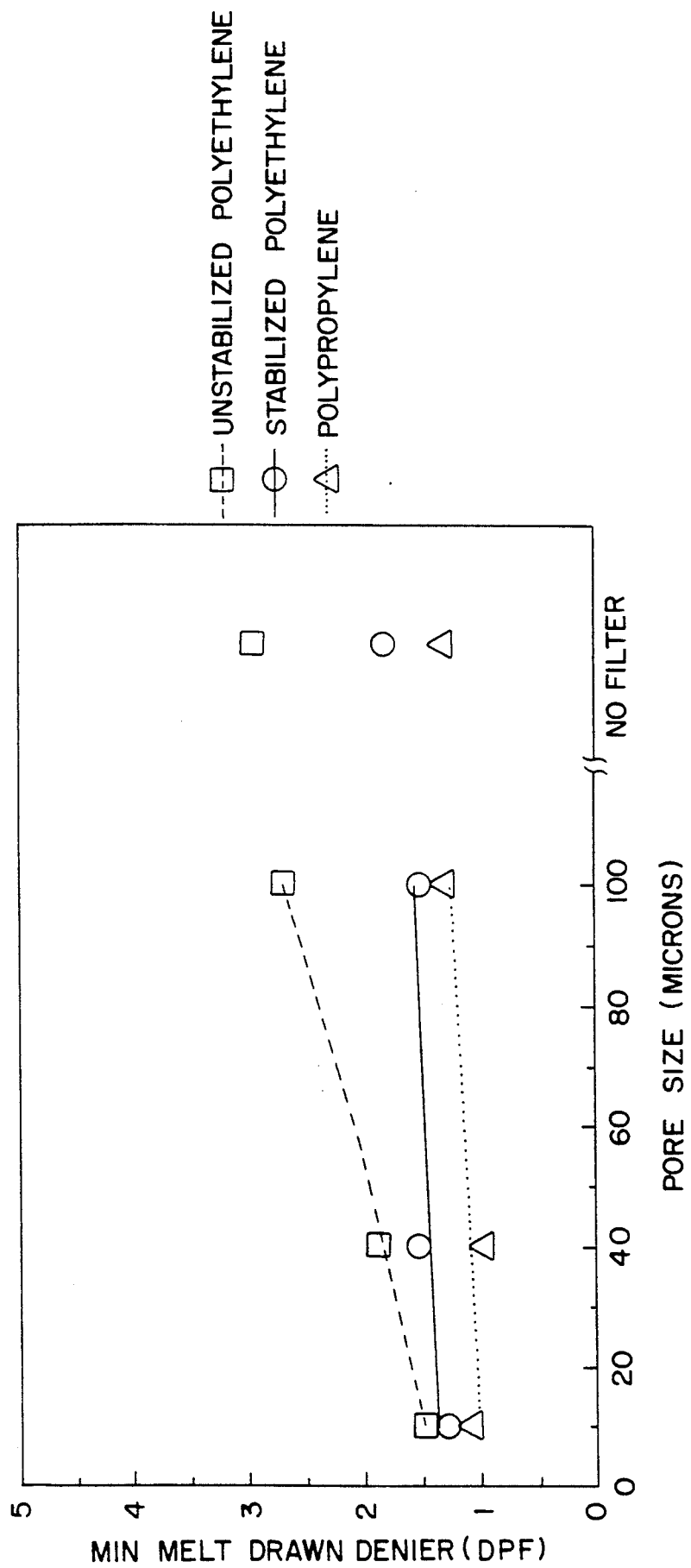
FIG. 2 graphically displays data from the comparative examples (Table 1) for melt spinning polypropylene at a melt temperature of 233° C., and from Example 1, Tables 4 and 7, for melt spinning two linear polyethylenes at a melt temperature of 224° C., both at a throughput rate of about 0.164 grams/minute/hole.
Figure 3:
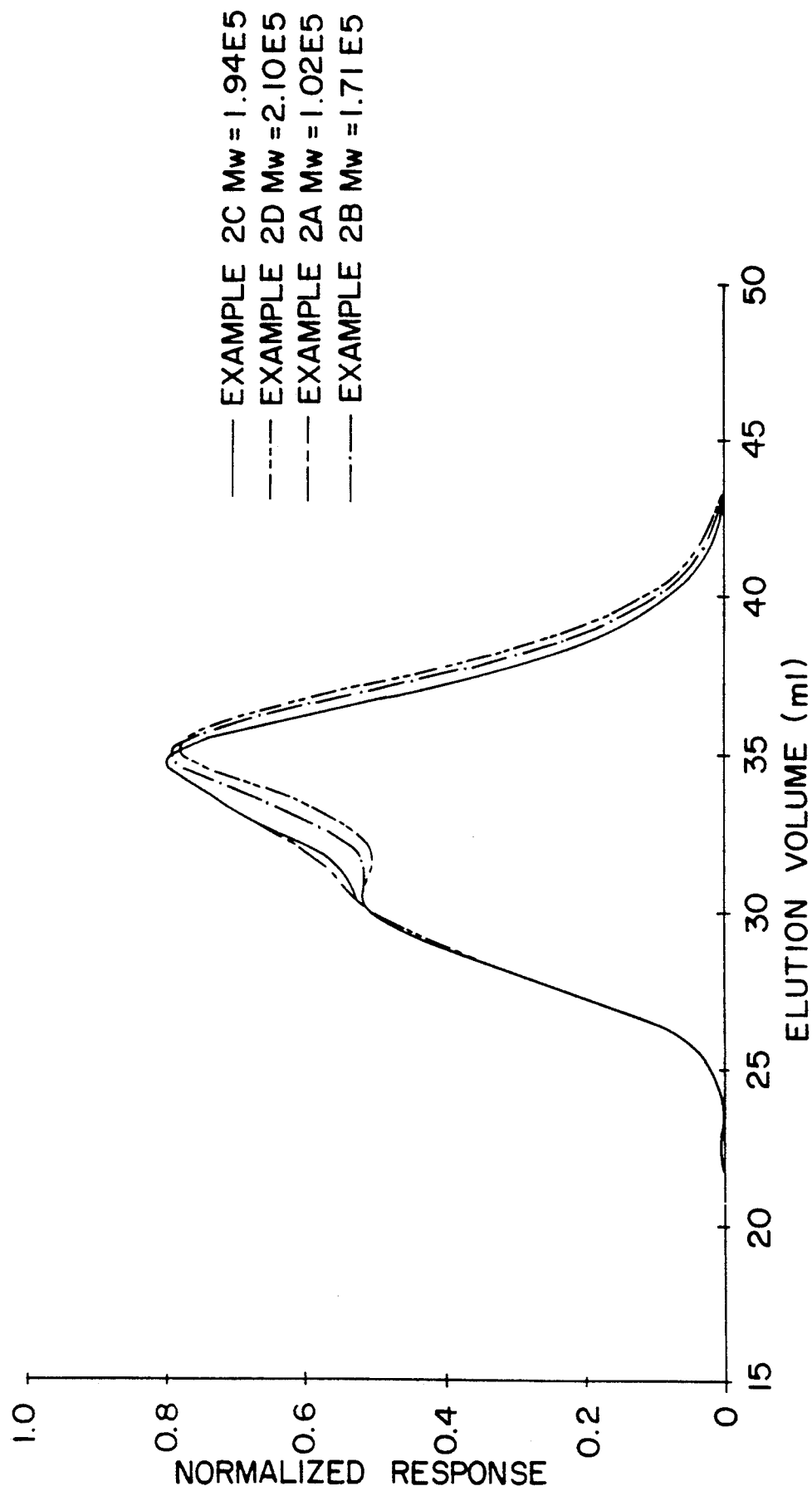
FIG. 3 graphically shows the GPC molecular weight distribution curves for four linear ethylene polymers.
Figure 4:
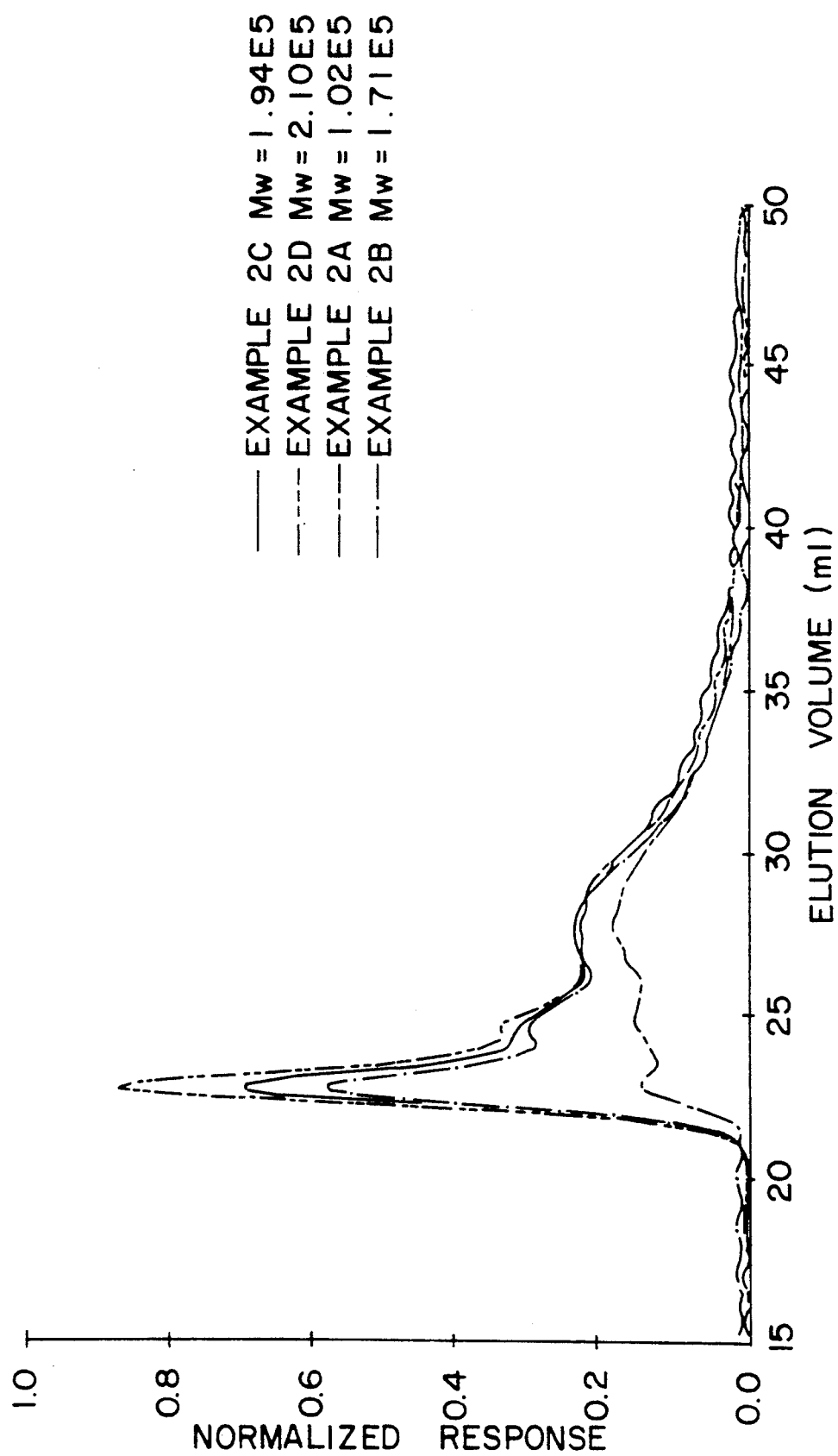
FIG. 4 graphically shows the GPC-LALLS molecular weight distribution curves for four linear ethylene polymers.

FIG. 2 graphically represents the effect of pore size on minimum melt drawn fiber denier for polypropylene and both the linear unstabilized polyethylene and the linear stabilized polyethylene, at a throughput rate of about 0.164 grams/minute/hole. The polyethylene melt temperature is about 224° C., as compared to the polypropylene melt temperature of about 233° C.

TABLE 7

Polyethylene (with 1000 ppm antioxidant)
108 hole spinneret/600 μm holes/4:1 L/D
Melt Temperature = 224° C.

| Filter "Pore Size" | Throughput (gm/min/hole) | Godet Speed (rpm) | Calculated denier per filament |
|---|---|---|---|
| 10 μm | 0.403 | >3200** | ≦2.37 |
|  | 0.164 | 2400 | 1.29 |
|  | 0.082 | 1200 | 1.29 |
| 40 μm | 0.403 | 3100 | 2.45 |
|  | 0.164 | 2000 | 1.54 |
|  | 0.082 | 950 | 1.63 |
| 100 μm | 0.403 | 2500 | 3.04 |
|  | 0.164 | 2050 | 1.51 |
|  | 0.082 | 1350 | 1.14 |
| NONE* | 0.403 | 2600 | 2.92 |
|  | 0.164 | 1700 | 1.82 |
|  | 0.082 | 700 | 2.21 |

*No filters used; 68 hole spinneret/600 μm holes/4:1 L/D
**Maximum melt draw speed As the graph indicates, polypropylene has minimum reduction in fiber diameter as a function of increasing shear in a spin pack, indicating very little effect on the spinning performance of polypropylene. The melt spinning performance of polyethylene, however, improves when increasing the shear media in the spin pack, especially while stabilizing the polyethylene and enables the polyethylene to be melt drawn to a finer diameter.

TABLE 8

Polyethylene (with 1000 ppm antioxidant)
108 hole spinneret/600 μm holes/4:1 L/D
Melt Temperature = 260° C.

| Filter "Pore Size" | Throughput (gm/min/hole) | Godet Speed (rpm) | Calculated denier per filament |
|---|---|---|---|
| 10 μm | 0.403 | 1050*** | 7.23 |
|  | 0.164 | >3300** | ≦0.94 |
|  | 0.082 | 2100 | 0.74 |

TABLE 8-continued

Polyethylene (with 1000 ppm antioxidant)
108 hole spinneret/600 μm holes/4:1 L/D
Melt Temperature = 260° C.

| Filter "Pore Size" | Throughput (gm/min/hole) | Godet Speed (rpm) | Calculated denier per filament |
|---|---|---|---|
| 40 μm | 0.403 | 1050*** | 7.23 |
|  | 0.164 | 2700 | 1.14 |
|  | 0.082 | 2050 | 0.75 |
| 100 μm | 0.403 | 1050 | 7.23 |
|  | 0.164 | 2000 | 1.54 |
|  | 0.082 | 1850 | 0.83 |
| NONE* | 0.403 | 1700 | 4.46 |
|  | 0.164 | 2450 | 1.26 |
|  | 0.082 | 1550 | 1 |

*No filters used; 68 hole spinneret/600 μm holes/4:1 L/D
**Maximum melt draw speed
***Quench difficulties; the polymer was too hot at high throughputs As the data indicate, use of high shear filtration media immediately prior to extrusion of a stabilized or unstabilized linear ethylene polymer through a spinneret die enables that linear ethylene polymer to be melt drawn to finer diameter for extended periods of time, with minimal fiber breakage.

EXAMPLE 2

Four linear ethylene polymer blends (ethylene/1-octene copolymers) are each made in an in situ-polymerized solution process two reactor system operated in series. Weight average molecular weight (using GPC and GPC-LALLS) is measured for each of the four linear ethylene polymer blends.

The solutions for study by GPC-LALLS are prepared by dissolving the samples in 1,2,4-trichlorobenzene (TCB) for at least 4 hours at 160° C. All samples are prepared on a weight to weight basis by dissolving a weighted amount of resin in a weighed amount of solvent. The concentration in g/ml is determined using 1.304 g/ml for the density of TCB at 145° C. The target concentration is 0.002 g/ml. Butylated hydroxytoluene (BHT) is used as a free radical scavenger at a concentration of 250 ppm.

The LALLS measurements are made using a Chromatix Model KMX-6 Low Angle Laser Light Scattering instrument. This instrument incorporates a He-Ne laser source with a wavelength of 632.8 nanometers.

The GPC used in this study is a Waters 150-C GPC/ALC. Molecular weights are calculated using internally developed data reduction techniques. Actual reported molecular weights are determined by integrating the LALLS output voltage.

Table 9 lists the parameters used and the conditions of the GPC-LALLS measurements.

TABLE 9

Experimental Conditions and Constants
Used In The GPC-LALLS Measurements

| Columns | Three 18 inch packed in-house. pore sizes - 1 × 10$^4$, 1 × 10$^5$, 1 × 10$^6$ Angstroms[1] |
|---|---|
| Flow Rate | 1.03 ml/min |
| Injection Volume | 300 ml |
| Interdetector Delay | 14 sec |
| DRI Detector | Sensitivity = 256 |
|  | Scale Factor = 8 |
| LALLS | Scattering Angle = 6-7° |
|  | Field Stop = 0.15 mm |
| Sample Concentration | 0.25 g/50 ml |
| dn/dc | −0.104 ml/g |

TABLE 9-continued

Experimental Conditions and Constants
Used In The GPC-LALLS Measurements

| | |
|---|---|
| Refractive index of TCB | 1.502 at 145° C. |
| Temperature | 145° C. |

[1] These pore sizes are based on the Waters' definition of pore sizes, i.e., the extended chain length of a molecule of polystyrene which is just large enough to be totally excluded from all the pores of a column.

Table 10 lists the properties of the four linear ethylene polymers:

TABLE 10

| Example | $I_2$ (g/10 min) | $I_{10}/I_2$ | Density (g/cc) | $M_w$ (GPC) | $M_w$ (GPC-LALLS) |
|---|---|---|---|---|---|
| 2A | 11.89 | 10.32 | .9543 | 64,500 | $1.02 \times 10^5$ |
| 2B | 9.84 | 10.56 | .9529 | 69,600 | $1.71 \times 10^5$ |
| 2C | 10.8 | 10.93 | .9531 | 63,800 | $1.94 \times 10^5$ |
| 2D | 12.28 | 10.06 | .9531 | 59,900 | $2.10 \times 10^5$ |

Each linear ethylene polymer blend is melt spun on a conventional spinning line using different degrees of shear media and is rated in terms of spinning efficiency, i.e., the number of complete fiber packages which are spun divided by the number of total fiber packages which are attempted to be spun. The target fiber diameter is about 9 dpf in each case. The data shown in Tables 11, 12 and 13 clearly demonstrate that linear ethylene polymers having a higher weight average molecular weight ($M_w$) as measured by GPC-LALLS can be melt spun more efficiently when a higher shear media is applied just prior to extrusion through the spinneret.

TABLE 11

325 mesh screens

| Example | Spinning Efficiency (%) |
|---|---|
| 2A | 98.6 |
| 2B | 81.7 |
| 2C | 41.7 |
| 2D | 0 |

TABLE 12

Double 400 mesh screens

| Example | Spinning Efficiency (%) |
|---|---|
| 2B | 95 |
| 2C | 90.8 |

TABLE 13

40 micron sintered metal*

| Example | Spinning Efficiency (%) |
|---|---|
| 2D | 92.7 |

*Throughput is about 63% of that used in Tables 11 and 12

EXAMPLE 3

Two linear ethylene polymers (both ethylene/1-octene interpolymers) are extruded at two throughputs through a melt spinning system and evaluated for die swell. The extrudate is collected into a vegetable oil bath which is placed approximately 1 inch from the die. The spinneret had only a single hole (diameter of 1350 micrometers or 0.053 inches). For each extrudate, 3 to 6 diameter measurements are made at 90 degree angles about the extrudate, at a point about 0.25 inches from the leading end. Base polymer properties are shown in Table 14:

TABLE 14

| Polymer | Melt Index (g/10 min) | $I_{10}/I_2$ | Density (g/cc) | Comments |
|---|---|---|---|---|
| 3A | 11.89 | 10.32 | 0.9543 | Broad MWD |
| 3B | ~12 | ~6.5 | ~0.95 | Narrow MWD |

The die swell results, calculated as the square of the ratio of the thickness of the extrudate divided by the hole size, with and without use of sintered metal filters, is shown in Table 15:

TABLE 15

| Polymer | Throughput (g/min) | Die Swell for Filter conditions | |
|---|---|---|---|
| | | None | 40 μm |
| 3A | 1.52 | 1.4301 | 1.1590 |
| 3A | 2.8 | 1.3197 | 0.9225 |
| 3B | 1.5 | 1.4663 | 1.0438 |
| 3B | 2.8 | 1.4755 | 1.0342 |

As the data clearly indicate, linear ethylene polymers which are extruded through higher shear media, (e.g., sintered metal filters) have lower die swell, and are thus examples of the present invention.

EXAMPLE 4

A linear ethylene polymer blend comprising a discrete polymer blend of 90 percent by weight of the total blend of an ethylene-1-octene copolymer having a melt index of 18 grams/10 minutes and a density of about 0.93 grams/cubic centimeter and 10 percent by weight of an ethylene-1-octene copolymer having a melt index of 105 grams/10 minutes and a density of about 0.953 grams/cubic centimeter is melt spun on a spunbond melt spinning line, using a throughput rate of about 0.8 grams/minute/hole and two different shear media in the spin pack. Table 16 describes the minimum stable fiber diameter obtained when using different shear media:

TABLE 16

| Filter Media | Minimum Fiber Size (DPF) |
|---|---|
| Screenpack* | 4.5 |
| 40 micron sintered metal | 2.3 |

*Six layer screen pack of 20/20/20/60/325/60 mesh

What is claimed is:

1. In a method of melt spinning at least one linear ethylene polymer into a fine denier fiber consisting essentially of linear ethylene polymer, the improvement characterized by applying an amount of shear and micro-mixing in a melt spin pack immediately prior to extrusion of the linear ethylene polymer through a spinneret die so that the linear ethylene polymer is melt drawn into a fiber of less than about 6 denier per filament.

2. The improvement of claim 1 wherein the shear and micromixing is applied by using a filter media selected from the group consisting of sintered metal filters, sand, and multiple layers of screens.

3. The improvement of claim 2 wherein the sintered metal filters comprise sintered metal filters of about 100 micrometers or less tortuous path size.

4. The improvement of claim 3 wherein the sintered metal filters comprise sintered metal filters of about 40 micrometers or less tortuous path size.

5. The improvement of claim 1 wherein the linear ethylene polymer has a weight average molecular weight of more than about $1 \times 10^5$ as measured using gel permeation chromatography with a low angle laser light scattering detector.

6. A method of improving the melt spinnability of at least one linear ethylene polymer having a weight average molecular weight of more than about $1 \times 10^5$ as measured using gel permeation chromatography with a low angle laser light scattering detector, said method comprising the steps of:
   (a) measuring weight average molecular weight of the linear ethylene polymer using gel permeation chromatography with a low angle laser light scattering detector,
   (b) comparing the weight average molecular weight with $1 \times 10^5$,
   (c) applying a shear higher than that imparted by a 325 mesh screen prior to extrusion of the linear ethylene polymer through a melt spinning die, and
   (d) melt spinning the linear ethylene polymer into a fiber having a diameter less than about 6 denier per filament, wherein the fiber consists essentially of linear ethylene polymer.

7. The method of claim 6 wherein the linear ethylene polymer has a $I_{10}/I_2$ of at least about 10.

8. A method of reducing die swell of a molten linear ethylene polymer comprising imparting high shear to the molten linear ethylene polymer just prior to extrusion of the polymer through a die.

9. The method of claim 8 wherein the high shear comprises at least two layers of 400 screen mesh.

10. The method of claim 8 wherein the high shear comprises sintered metal filter media.

11. The method of claim 8 further comprising the step of melt spinning the molten linear ethylene polymer into a fiber having a diameter less than about 6 denier per filament.

* * * * *